United States Patent
Shi et al.

(10) Patent No.: US 9,838,913 B2
(45) Date of Patent: Dec. 5, 2017

(54) METHOD AND APPARATUS FOR REMOVING POLICY AND CHARGING CONTROL RULE FROM DEFAULT BEARER

(71) Applicant: Huawei Technologies Co., Ltd., Shenzhen (CN)

(72) Inventors: Xiaoyan Shi, Beijing (CN); Weihua Qiao, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 376 days.

(21) Appl. No.: 14/542,284

(22) Filed: Nov. 14, 2014

(65) Prior Publication Data

US 2015/0063310 A1   Mar. 5, 2015

Related U.S. Application Data

(63) Continuation of application No. PCT/CN2012/075503, filed on May 15, 2012.

(51) Int. Cl.
*H04L 12/28* (2006.01)
*H04W 36/00* (2009.01)
(Continued)

(52) U.S. Cl.
CPC ..... *H04W 36/0022* (2013.01); *H04L 41/0893* (2013.01); *H04L 65/1016* (2013.01);
(Continued)

(58) Field of Classification Search
CPC .............................................. H04W 36/0083
(Continued)

(56) References Cited

U.S. PATENT DOCUMENTS 8,483,182 B1 * 7/2013 Keller ................ H04L 65/1083
370/331
8,670,411 B2 * 3/2014 Xie ................... H04W 36/0022
370/331
(Continued)

FOREIGN PATENT DOCUMENTS

CN          102238676 A      11/2011
CN          102387558 A       3/2012
(Continued)

OTHER PUBLICATIONS

"3rd Generation Partnership Project; Technical Specification Group Services and System Aspects; Single Radio Voice Call Continuity (SRVCC); Stage 2 (Release 11)," 3GPP TS 23.216, V11.4.0, Mar. 2012, 64 pages.

(Continued)

*Primary Examiner* — Ricky Ngo
*Assistant Examiner* — Dewanda Samuel
(74) *Attorney, Agent, or Firm* — Slater Matsil, LLP

(57) ABSTRACT

The present invention provides a method and an apparatus for removing a policy and charging control rule from a default bearer. The method includes: determining whether a received service flow is a service flow of SRVCC switching upon receipt of flow description information of the service flow; and, if the received service flow is the service flow of the SRVCC switching, removing a policy and charging control rule that has been activated on a default bearer for the SRVCC switching, and at the same time issuing a policy and charging control rule made for a newly created bearer.

20 Claims, 11 Drawing Sheets

(51) Int. Cl.
*H04L 12/24* (2006.01)
*H04L 29/06* (2006.01)
*H04M 15/00* (2006.01)
*H04W 4/24* (2009.01)

(52) U.S. Cl.
CPC ...... *H04L 65/1073* (2013.01); *H04L 65/1083* (2013.01); *H04M 15/66* (2013.01); *H04W 4/24* (2013.01)

(58) Field of Classification Search
USPC .......................... 370/389, 395.2, 395.21, 377
See application file for complete search history.

(56) References Cited

U.S. PATENT DOCUMENTS

| | | | | |
|---|---|---|---|---|
| 8,908,681 | B1* | 12/2014 | Cope | H04M 3/56 370/354 |
| 8,971,875 | B2* | 3/2015 | Vedrine | H04W 36/0022 370/331 |
| 2006/0057961 | A1* | 3/2006 | Dietz | H04M 3/465 455/41.2 |
| 2010/0130207 | A1* | 5/2010 | Wu | H04W 36/0066 455/436 |
| 2011/0188451 | A1* | 8/2011 | Song | H04W 36/0033 370/328 |
| 2011/0201302 | A1* | 8/2011 | Hatton | G08G 1/205 455/404.2 |
| 2011/0208853 | A1* | 8/2011 | Castro-Castro | H04L 12/14 709/223 |
| 2012/0003969 | A1* | 1/2012 | Anderson | H04W 76/002 455/414.2 |
| 2012/0039303 | A1* | 2/2012 | Stenfelt | H04W 36/0022 370/331 |
| 2012/0044867 | A1* | 2/2012 | Faccin | H04W 60/06 370/328 |
| 2013/0051368 | A1 | 2/2013 | Liu et al. | |
| 2014/0140324 | A1 | 5/2014 | Stenfelt et al. | |

FOREIGN PATENT DOCUMENTS

| | | |
|---|---|---|
| CN | 102415150 A | 4/2012 |
| WO | 2011047726 A1 | 4/2011 |

OTHER PUBLICATIONS

"3rd Generation Partnership Project; Technical Specification Group Services and System Aspects; IP Multimedia Subsystem (IMS) Service Continuity; Stage 2 (Release 11)," 3GPP TS 23.237, V11.4.0, Mar. 2012, 162 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 11)," 3GPP TS 23.401, V11.1.0, Mar. 2012, 284 pages.

"3rd Generation Partnership Project; Technical Specification Group Services and System Aspects; Single Radio Voice Call Continuity (SRVCC); Stage 2 (Release 11)," Draft 3GPP TS 23.216, V11.3.0+, Jan. 2012, 62 pages.

"3rd Generation Partnership Project; Technical Specification Group Core Network and Terminals; Policy and Charging Control (PCC) over Gx/Sd reference point (Release 11)," 3GPP TS 29.212, V11.4.0, Mar. 2012, 182 pages.

Allot Communications, et al., "Unsolicited application reporting functionality corrections," SA WG2 Meeting #90, S2-121806, Change Request 23.203 CR 0699, Rev. 2, Current version 11.5.0, Apr. 16-20, 2012, 18 pages.

ZTE, "PCC support for rSRVCC," 3GPP TSG-CRT WG3 Meeting #68-BIS, C3-120645, Change Request 29.212 CR 0817, Current Version: 11.4.0, Apr. 16-20, 2012, 10 pages.

* cited by examiner

METHOD AND APPARATUS FOR REMOVING POLICY AND CHARGING CONTROL RULE FROM DEFAULT BEARER

This application is a continuation of International Application No. PCT/CN2012/075503, filed on May 15, 2012, which is hereby incorporated by reference in its entirety.

TECHNICAL FIELD

The present invention relates to the communications field and, in particular embodiments, to a method and an apparatus for removing a policy and charging control rule from a default bearer.

BACKGROUND

The Evolved Packet Core (EPC) architecture is a mobile network architecture defined by the 3rd Generation Partnership Project 3GPP) in TS 23.401, and mainly includes network elements such as a packet data network gateway (PGW), a mobility management entity (MME), and a policy control and charging rules function entity (PCRF). The PGW, as an interface gateway between an EPC network and a packet data network (PDN) that provides services, is responsible for forwarding and filtering user data flows, allocating user IP addresses, executing quality of service (QoS) policies and charging, or the like. The MME is mainly responsible for user mobility management, user attachment signaling processing, or the like. The PCRF makes a decision on a policy and charging control (PCC) rule according to user access network information (which is acquired from a Gx interface), an operator policy (which is locally configured), user subscription data (which is acquired from a user subscription database), information (which is obtained from an Rx interface) about an ongoing IP multimedia subsystem (IMS) service of a user or the like, and provides the rule to the PGW for execution, thereby implementing policy and charging control. The PCC rule includes IP flow description information (such as source and destination addresses of an IP packet and source and destination port numbers), an execution policy corresponding to the IP flow description information, QoS information (such as a priority and a bandwidth), access control information (forward/discard), charging information, and the like.

The 3GPP has further defined Single Radio Voice Call Continuity (SRVCC) in TS 23.216. SRVCC is used to resolve an issue about continuity of a voice call when a user equipment (UE) switches between different access technologies, and a process of switching, by the UE, from a circuit switching (CS) domain of a 2G/3G network to a packet switching (PS) domain of a 3G/LTE network is described. That is, the UE uses an IMS voice service in the CS domain of 2G/3G access defined by the 3GPP; and when the UE moves out of coverage of the CS domain or a signal of the CS domain is relatively poor, the UE switches to the PS domain of 3G/LTE access and continues to use the IMS voice service through the PS domain. A basic principle of switching the IMS voice service from the CS domain to the PS domain is as follows: The UE completes IMS registration in the PS domain beforehand, and negotiates information, such as an IP port on a UE side for performing the voice service in the PS domain, with an IMS network; when the UE is ready to switch IMS from the CS domain to the PS domain, a mobile switching center (MSC), which is a core network element in the CS domain, notifies an MME in the PS domain that switching will occur soon, so that the MME performs resource allocation beforehand; and at the same time, the MME interacts with the IMS network to acquire an IP port number of an IMS network side that the IMS network allocates for the to be switched, and sends the IP port number to the UE. In this way, the UE may send or receive an IMS voice data packet after being attached to a PS network, thereby ensuring continuity of the IMS voice service.

A specific process of switching the IMS voice service in an SRVCC scenario includes step S101 to step S116, which are described in the following.

S101. A base station controller or a radio network controller sends a switching request to the MSC.

S102. The MSC interacts with a device on the IMS network side and acquires an IP port number (media ports) allocated by the device on the IMS network side.

S103. The MSC sends a switching request for switching the UE from the CS domain to the PS domain to a destination MME or a destination SGSN, and the destination MME or the destination SGSN acquires an indication from the CS domain.

S104. The destination MME or the destination SGSN sends a context request to a source MME or a source SGSN.

S105. The source MME or the source SGSN returns a response of the context request to the destination MME or the destination SGSN.

S106. The destination MME or the destination SGSN completes resource reservation on a PS network side.

S107. The destination MME or the destination SGSN returns a response of the switching request for switching the UE from the CS domain to the PS domain to the MSC.

S108. The MSC returns the response obtained in step S107 to the UE.

S109. The MSC sends a session transfer preparation request to the device on the IMS network side, and the device on the IMS network side stops sending a voice service packet to the CS domain and starts sending a voice service packet to the PS domain, where a source port of the packet is an IP port allocated by the device on the IMS network side, and a destination port of the packet is an IP port of the UE side negotiated beforehand between the UE and the device on the IMS network.

S110. The UE switches to the PS domain.

S111. The source MME or the source SGSN notifies the MSC that "the UE has been attached to the PS domain".

S112. The destination MME or the destination SGSN notifies a PGW in the PS domain that "the UE has completed the CS-to-PS switching".

S113. The PGW interacts with a PCRF to activate a PCC rule on a default bearer.

The PCC rule activated on the default bearer is used to temporarily transmit the IMS voice service during the switching from the circuit switched domain to the packet switched domain.

S114. The destination MME or the destination SGSN sends a context acknowledgment message to the source MME or the source SGSN.

S115. The source MME or the source SGSN interacts with the base station controller or the radio network controller to release resources.

In steps S116 to S117, the UE interacts with the device on the IMS network side, notifies the device on the IMS network side that the switching is completed, and the device on the IMS network side triggers the PS domain to create a dedicated bearer for the IMS voice service of the UE, thereby ensuring quality of service of the IMS voice service.

As can be seen from the preceding switching process, in the process of switching the IMS voice service of the UE from the CS domain to the PS domain, the PCRF installs a PCC rule on the PGW for the default bearer so as to temporarily transmit the IMS voice service. After the dedicated bearer is established for the IMS voice service, that is, after step S117 in the preceding process is performed, all data packets of the IMS voice service start to be sent on the dedicated bearer and the PCC rule on the default bearer is no longer valid; and for resource saving reasons, the PCC rule on the default bearer should be deleted.

A method for deleting the PCC rule on the default bearer provided in the prior art is implemented on a basis of a timer mechanism. That is, a timer is simultaneously started when the PCRF or the PGW installs the PCC rule on the default bearer for the IMS voice service switching from CS to PS; and when a preset duration of the timer expires, the PCC rule on the default bearer is deleted.

In many scenarios, it cannot be predicted when the device on the IMS network side triggers the PS domain to create the dedicated bearer for the IMS voice service of the UE, and therefore actually the timer duration cannot be accurately preset in the prior art. As a result, if the preset timer duration is excessively short, the PCC rule on the default bearer is deleted before a dedicated bearer is created for the IMS voice service of the UE and the UE cannot receive a data packet; or if the preset timer duration is excessively long, an invalid PCC rule stays on the PGW for a long time, thereby causing a resource waste.

SUMMARY

Embodiments of the present invention provide a method and an apparatus for removing a policy and charging control rule from a default bearer, so as to remove a temporary policy and charging control rule accurately and in time and maintain continuity of a voice service of a user equipment.

An embodiment of the present invention provides a method for removing a policy and charging control rule from a default bearer. The method includes: determining whether a received service flow is a service flow of Single Radio Voice Call Continuity SRVCC switching upon receipt of flow description information of the service flow; and if the received service flow is the service flow of the Single Radio Voice Call Continuity SRVCC switching, removing a policy and charging control rule that has been activated on a default bearer for the SRVCC switching, and at the same time issuing a policy and charging control rule made for a newly created bearer.

An embodiment of the present invention provides an apparatus for removing a policy and charging control rule from a default bearer. The apparatus includes: a determining module, configured to determine whether a received service flow is a service flow of Single Radio Voice Call Continuity SRVCC switching upon receipt of flow description information of the service flow; and a policy and charging control rule processing module, configured to remove, if the determining module determines that the received service flow is the service flow of the Single Radio Voice Call Continuity SRVCC switching, a policy and charging control rule that has been activated on a default bearer for the SRVCC switching, and at the same time issue a policy and charging control rule made for a newly created bearer.

As can be seen from the embodiments of the present invention, when it is determined that an activated policy and charging control rule exists on a default bearer, an indication is given to remove the activated policy and charging control rule from the default bearer, and at the same time a policy and charging control rule made for a newly created bearer is issued. Compared with the prior art in which whether a set timer expires is used as a criterion for determining whether to delete the activated policy and charging control rule from the default bearer, the method according to the embodiments of the present invention does not rely on timer setting; therefore, an issue about inaccurate setting of a timer duration does not exist, and the activated policy and charging control rule can be removed from the default bearer accurately and in time while continuity of a voice service of a user equipment can be maintained. In addition, resources are saved because the activated policy and charging control rule is removed from the default bearer in time.

BRIEF DESCRIPTION OF THE DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Embodiments of the present invention provide a method and an apparatus for removing a policy and charging control rule from a default bearer, so as to remove a temporary policy and charging control rule accurately and in time and maintain continuity of a voice service of a user equipment.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
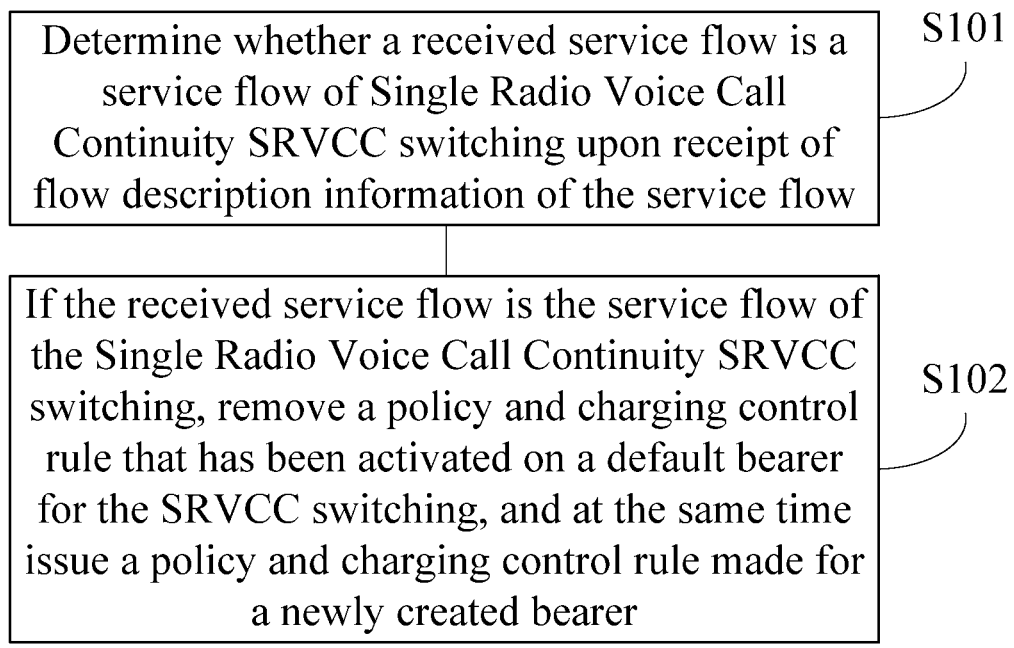
FIG. 1 is a schematic flowchart of a method for removing a policy and charging control rule from a default bearer according to an embodiment of the present invention.

Refer to FIG. 1, which is a schematic flowchart of a method for removing a policy and charging control rule from a default bearer according to an embodiment of the present invention. An executor of the method may be a policy control and charging rules function entity PCRF, a packet data network gateway PGW, or the like. The method mainly includes step S101 and step S102.

S101. Determine whether a received service flow is a service flow of Single Radio Voice Call Continuity SRVCC switching upon receipt of flow description information of the service flow.

In the embodiment of the present invention, receiving the flow description information of the service flow may be regarded as a condition for triggering the determination of whether the received service flow is the service flow of the Single Radio Voice Call Continuity SRVCC switching. The service flow may be an IMS voice service flow or an IMS video service flow; the flow description information may be IMS service flow description information generated after the IMS service switches from a circuit switched domain to a packet switched domain; and the flow description information may be content included in service establishment or modification signaling sent by an IMS network device such as an application function entity (AF) or a proxy call session control function (P-CSCF), or content included in IP-CAN session modification signaling sent by a packet data network gateway (PGW), or content included in a bearer resource command received by a PGW from a service gateway (SGW) or a mobility management entity (MME), and a source of the flow description information is not limited in the present invention.

S102. If the received service flow is the service flow of the Single Radio Voice Call Continuity SRVCC switching, remove a policy and charging control rule that has been activated on a default bearer for the SRVCC switching, and at the same time issue a policy and charging control rule made for a newly created bearer.

In the embodiment of the present invention, the Single Radio Voice Call Continuity SRVCC switching may be switching of the IMS service from the circuit switched domain to the packet switched domain, and the service flow of the SRVCC witching may be an IMS service flow. After the IMS service switches from the circuit switched domain to the packet switched domain, a system creates a new bearer for the IMS service that has switched to the PS domain and makes a policy and charging control rule that corresponds to the new bearer. The policy and charging control rule that has been activated on the default bearer for the SRVCC switching is for temporary use during the switching of the IMS service from the circuit switched domain to the packet switched domain. Therefore, after the policy and charging control rule that corresponds to the new bearer is made, the policy and charging control rule activated on the default bearer during the switching of the IMS service from the circuit switched domain to the packet switched domain is no longer needed, and the policy and charging control rule that has been activated on the default bearer for the SRVCC switching may be removed at the same time when the policy and charging control rule made for the newly created bearer is issued.

As can be seen from the method for removing a policy and charging control rule from a default bearer according to the embodiment of the present invention, only when it is determined that a received service flow is a service flow of the Single Radio Voice Call Continuity SRVCC switching, is a policy and charging control rule that has been activated for SRVCC switching on a default bearer removed, and at the same time, is a policy and charging control rule made for a newly created bearer issued. Therefore, compared with the prior art in which whether a set timer expires is used as a criterion for determining whether to delete the activated policy and charging control rule from the default bearer, the method according to the embodiment of the present invention does not rely on timer setting; therefore, an issue about inaccurate setting of a timer duration does not exist, and the activated policy and charging control rule can be removed from the default bearer accurately and in time while continuity of a voice service of a user equipment can be maintained. In addition, resources are saved because the activated policy and charging control rule is removed from the default bearer in time.

In the embodiment of the present invention, the flow description information includes a port number of a service flow packet, that is, a port number of an IP packet sent by a device on an IMS network side to the user equipment or a port number of an IP packet sent by the user equipment to a device on an IMS network side. The port number of the service flow packet includes a destination port number and/or a source port number of a downlink packet of the service flow. For the downlink packet, "destination" in the "destination port number" obviously refers to the user equipment, whereas "source" in the "source port number"

obviously refers to the device on the IMS network side. The destination port number of the downlink packet of the service flow corresponds to a source port number of an uplink packet of the service flow, and the source port number of the downlink packet of the service flow corresponds to a destination port number of the uplink packet of the service flow.

Because the flow description information includes the port number of the service flow packet, the determining whether a received service flow is a service flow of Single Radio Voice Call Continuity SRVCC switching may be: matching a port number reserved for the SRVCC switching with the port number of the service flow packet included in the flow description information, and if the port number reserved for the SRVCC switching is consistent with the port number of the service flow packet included in the flow description information, determining that the received service flow is the service flow of the Single Radio Voice Call Continuity SRVCC switching. In the embodiment of the present invention, the port number reserved for the SRVCC switching may be content included in service establishment or modification signaling sent by an IMS network device such as an application function entity (AF) or a proxy call session control function (P-CSCF), or content included in IP-CAN session modification signaling sent by a packet data network gateway (PGW), or content included in a bearer resource command received by a PGW from a service gateway (SGW) or a mobility management entity (MME) during the switching of the IMS service from the circuit switched domain to the packet switched domain, and a source of the flow description information is not limited in the present invention.

If the port number of the service flow packet includes the destination port number of the downlink packet of the service flow, an embodiment of matching the port number reserved for the SRVCC switching with the port number of the service flow packet included in the flow description information may be: matching, by the policy control and charging rules function entity PCRF, the destination port number of the downlink packet of the service flow included in the flow description information with a port number that is reserved by the user equipment for the SRVCC switching during registration to an IMS network. Before the policy control and charging rules function entity PCRF matches the destination port number of the downlink packet of the service flow included in the flow description information with the port number that is reserved by the user equipment for the SRVCC switching during the registration to the IMS network, the PCRF interacts with an application function entity AF or a proxy call session control function P-CSCF to acquire the port number that is reserved by the user equipment for the SRVCC switching during the registration to the IMS network; and after a switching process of switching the IMS service from the circuit switched domain to the packet switched domain is completed, the PCRF acquires the flow description information by interacting with the AF or the P-CSCF. In this embodiment, the port number that is reserved by the user equipment for the SRVCC switching during the registration to the IMS network is also the destination port number of the downlink packet of the IMS service flow and certainly also the source port number of the uplink packet of the IMS service flow.

Figure 2:
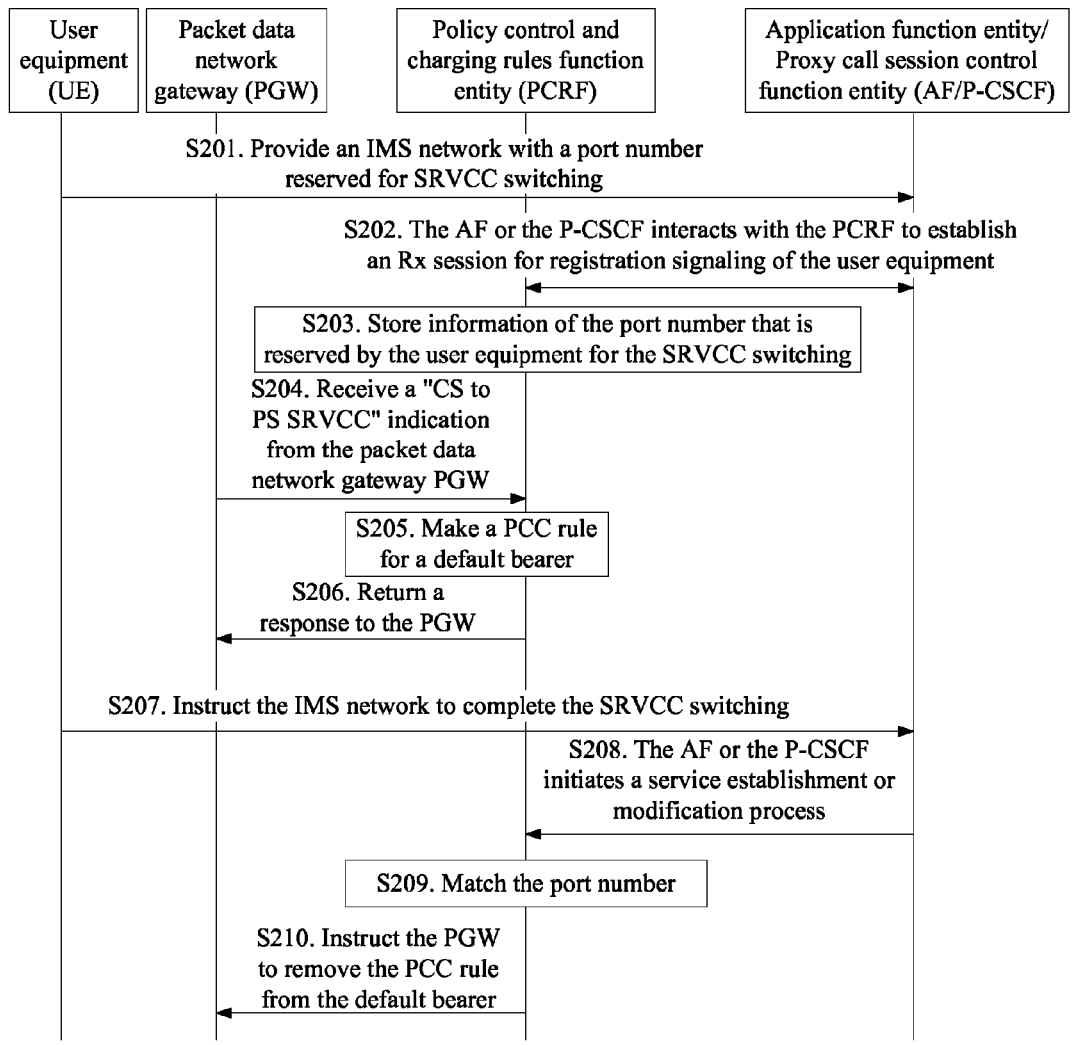
FIG. 2 is a schematic flowchart of interaction between various functional modules in a method for removing a policy and charging control rule from a default bearer according to an embodiment of the present invention.

For a clearer description of the foregoing embodiment, referring to FIG. 2, a process of interaction between various functional modules in a method for removing a policy and charging control rule from a default bearer according to an embodiment of the present invention includes step S201 to step S210. A detailed description is discussed below.

S201. A user equipment provides an IMS network with a port number reserved for SRVCC switching.

The port number reserved for the SRVCC switching that is provided by the user equipment for the IMS network may be reserved when the user equipment registers to the IMS network during switching of an IMS service from a circuit switched domain to a packet switched domain, which is one of preparatory work for switching the IMS service from the circuit switched domain to the packet switched domain. The information of the port number that is reserved by the user equipment for the SRVCC switching may be sent through registration signaling to the IMS network. The IMS network may specifically refer to a device or an entity unit on an IMS network side, such as an application function entity (AF) or a proxy call session control function (P-CSCF).

S202. The AF or the P-CSCF interacts with a PCRF to establish an Rx session for registration signaling of the user equipment.

When establishing the Rx session for the registration signaling of the user equipment, the AF or the P-CSCF points out the port number that is reserved by the user equipment for the SRVCC switching to the PCRF. As described previously, the port number that is reserved by the user equipment for the SRVCC switching is also the destination port number of the downlink packet of the IMS service flow and certainly also the source port number of the uplink packet of the IMS service flow.

S203. The PCRF stores information of the port number that is reserved by the user equipment for the SRVCC switching.

S204. The PCRF receives a "CS to PS SRVCC" indication from a packet data network gateway PGW.

The "CS to PS SRVCC" indication points out that the IMS service will switch from the circuit switched domain to the packet switched domain.

S205. The PCRF makes a policy and charging control (Policy and Charging Control, PCC) rule for a default bearer.

After the PCC rule is made for the default bearer, a data packet to or from the IMS network is allowed to be transmitted on the default bearer. A specific method for making a PCC rule may be: directly activating a pre-configured PCC rule, or making a PCC rule according to the information of the port number that is reserved by the user equipment for the SRVCC switching and stored by the PCRF in step S203. A specific manner of making the PCC rule for the default bearer may not be limited in the present invention.

S206. The PCRF returns a response to the PGW.

The response is used for the PGW to install the made PCC rule on the default bearer.

S207. The user equipment instructs the IMS network to complete the SRVCC switching.

In the embodiment of the present invention, the Single Radio Voice Call Continuity (Single Radio Voice Call Continuity, SRVCC) switching refers to switching of an IMS voice service from the circuit switched domain to the packet switched domain.

S208. The application function entity (AF) or the proxy call session control function entity (P-CSCF) initiates a service establishment or modification process.

When the AF or the P-CSCF initiates the service establishment or modification process, signaling includes flow description information, such as the destination port number, the source port number, a destination IP address, and a source IP address of the downlink packet of the IMS service flow.

S209. The PCRF matches the port number.

In this embodiment, the matching may specifically be matching, by the PCRF, the destination port number of the downlink packet of the service flow included in the flow description information with a port number that is reserved by the user equipment for the SRVCC switching during the registration to the IMS network.

It should be noted that in step S209, the PCRF may further make, according to the flow description information sent by the AF or the P-CSCF, a PCC rule corresponding to a new bearer created by a system for the IMS service that has switched to the PS domain.

S210. The PCRF instructs the PGW to remove the PCC rule from the default bearer.

That is, the PCRF instructs the PGW to remove the PCC rule made by the PCRF for the default bearer in step S205.

It should be noted that in step S210, while instructing the PGW to remove the PCC rule from the default bearer, the PCRF may further issue the PCC rule made in step S209 that corresponds to the new bearer to the PGW, so that the PGW installs the new PCC rule. Such new PCC rules are used for the new bearer to transmit the IMS service that has switched to the PS domain.

If the port number of the service flow packet includes the source port number of the downlink packet of the service flow, another embodiment of matching the port number reserved for the SRVCC switching with the port number of the service flow packet included in the flow description information may be matching, by the policy control and charging rules function entity PCRF, the source port number of the downlink packet of the service flow included in the flow description information with a port number that is reserved by the IMS network for the SRVCC switching. Before the policy control and charging rules function entity PCRF matches the source port number of the downlink packet of the service flow included in the flow description information with the port number that is reserved by the IMS network for the SRVCC switching, the PCRF interacts with the packet data network gateway PGW and acquires the port number that is reserved by the IMS network for the SRVCC switching; and after a switching process of switching the IMS service from the circuit switched domain to the packet switched domain is completed, the PCRF acquires the flow description information by interacting with the application function entity AF or the proxy call session control function entity P-CSCF. In this embodiment, the port number that is reserved by the IMS network for the SRVCC switching is also the source port number of the downlink packet of the IMS service flow and certainly also the destination port number of the uplink packet of the IMS service flow.

Figure 3:
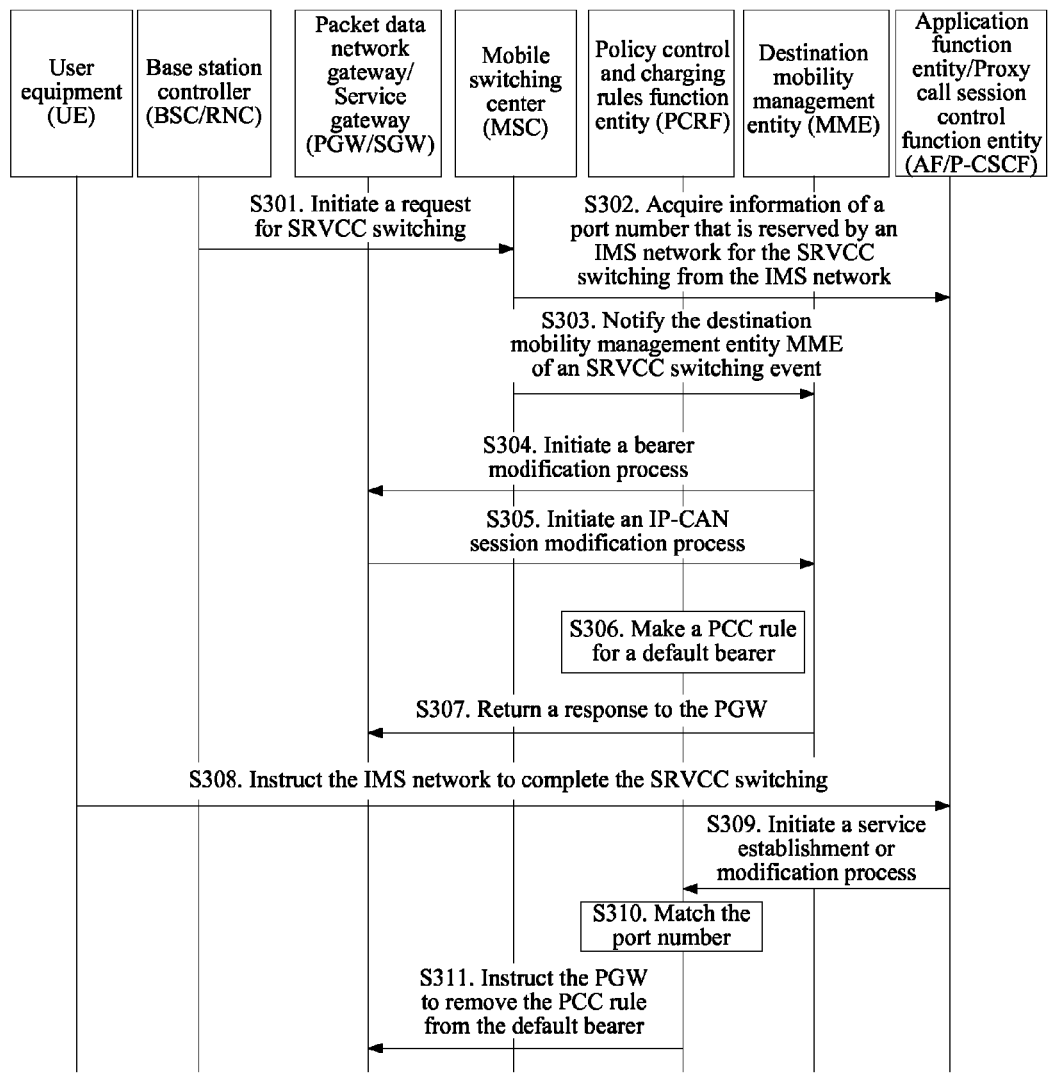
FIG. 3 is a schematic flowchart of interaction between various functional modules in a method for removing a policy and charging control rule from a default bearer according to another embodiment of the present invention.

For a clearer description of the foregoing embodiment, referring to FIG. 3, a process of interaction between various functional modules in a method for removing a policy and charging control rule from a default bearer according to another embodiment of the present invention includes step S301 to step S311. A detailed description is discussed below.

S301. A base station controller initiates a request for SRVCC switching.

In this embodiment, the base station controller may be a 2G base station controller (BSC) in a circuit switched domain, or a 3G radio network controller (RNC).

S302. A mobile switching center MSC acquires information of a port number that is reserved by an IMS network for the SRVCC switching from the IMS network.

Specifically, the MSC interacts with an AF or a P-CSCF to acquire information of a port number that is reserved by the AF or the P-CSCF for the SRVCC switching from the AF or the P-CSCF. As described previously, the port number that is reserved by the AF or the P-CSCF for the SRVCC switching is also the source port number of the downlink packet of the IMS service flow and certainly also the destination port number of the uplink packet of the IMS service flow.

S303. The mobile switching center MSC notifies a destination mobility management entity MME of an SRVCC switching event.

When sending the notification, the mobile switching center points out the port number that is reserved by the AF or the P-CSCF for the SRVCC switching to the destination mobility management entity MME.

S304. The destination mobility management entity MME initiates a bearer modification process.

When the destination mobility management entity MME initiates the bearer modification process, signaling carries information such as a "CS to PS SRVCC" indication and the port number that is reserved by the AF or the P-CSCF for the SRVCC switching. Such information is sent through a service gateway SGW to a packet data network gateway PGW.

S305. The packet data network gateway PGW initiates an IP-CAN session modification process.

When the packet data network gateway PGW initiates the IP-CAN session modification process, signaling carries information such as the "CS to PS SRVCC" indication and the port number that is reserved by the AF or the P-CSCF for the SRVCC switching. Such information is sent to a policy control and charging rules function entity PCRF, and is saved by the PCRF.

S306. The PCRF makes a PCC rule for a default bearer.

After the PCC rule is made for the default bearer, a data packet to or from the IMS network is allowed to be transmitted on the default bearer. A specific method for making a PCC rule may be: directly activating a pre-configured PCC rule, or making a PCC rule according to the information of the port number that is reserved by the AF or the P-CSCF for the SRVCC switching and stored by the PCRF in step S305. A specific manner of making the PCC rule for the default bearer may not be limited in the present invention.

S307. The PCRF returns a response to the PGW.

The response is used for the PGW to install the made PCC rule on the default bearer.

S308. A user equipment instructs the IMS network to complete the SRVCC switching.

In the embodiment of the present invention, the Single Radio Voice Call Continuity (Single Radio Voice Call Continuity, SRVCC) switching refers to switching of an IMS service from the circuit switched domain to the packet switched domain.

S309. The application function entity (Application Function, AF) or the proxy call session control function entity (Proxy Call Session Control Function, P-CSCF) initiates a service establishment or modification process.

When the AF or the P-CSCF initiates the service establishment or modification process, signaling sent to the PCRF includes flow description information, such as the destination port number, the source port number, the destination IP address, and the source IP address of the downlink packet of the IMS service flow.

S310. The PCRF matches the port number.

In this embodiment, the matching may specifically be: matching, by the PCRF, the source port number of the downlink packet of the service flow included in the flow description information with the port number that is reserved by the AF or the P-CSCF for the SRVCC switching.

It should be noted that in step S310, the PCRF may further make, according to the flow description information sent by the AF or the P-CSCF, a PCC rule corresponding to a new bearer created by a system for the IMS service that has switched to the PS domain.

S311. The PCRF instructs the PGW to remove the PCC rule from the default bearer.

That is, the PCRF instructs the PGW to remove the PCC rule made by the PCRF for the default bearer in step S306.

It should be noted that in step S311, while instructing the PGW to remove the PCC rule from the default bearer, the PCRF may further issue the PCC rule made in step S310 that corresponds to the new bearer to the PGW, so that the PGW installs the new PCC rule. Such new PCC rules are used for the new bearer to transmit the IMS service that has switched to the PS domain.

If the port number of the service flow packet includes the source port number of the downlink packet of the service flow, still another embodiment of matching the port number reserved for the SRVCC switching with the port number of the service flow packet included in the flow description information may be: matching, by the packet data network gateway PGW, the source port number of the downlink packet of the service flow included in the flow description information with the port number that is reserved by the IMS network for the SRVCC switching. Before the packet data network gateway PGW matches the source port number of the downlink packet of the service flow included in the flow description information with the port number that is reserved by the IMS network for the SRVCC switching, the PGW interacts with the destination mobility management entity MME and acquires the port number that is reserved by the IMS network for the SRVCC switching; and after a switching process of switching the IMS service from the circuit switched domain to the packet switched domain is completed, the PGW acquires the flow description information by interacting with the destination MME. In this embodiment, the port number that is reserved by the IMS network for the SRVCC switching is also the source port number of the downlink packet of the IMS service flow and certainly also the destination port number of the uplink packet of the IMS service flow.

Figure 4:
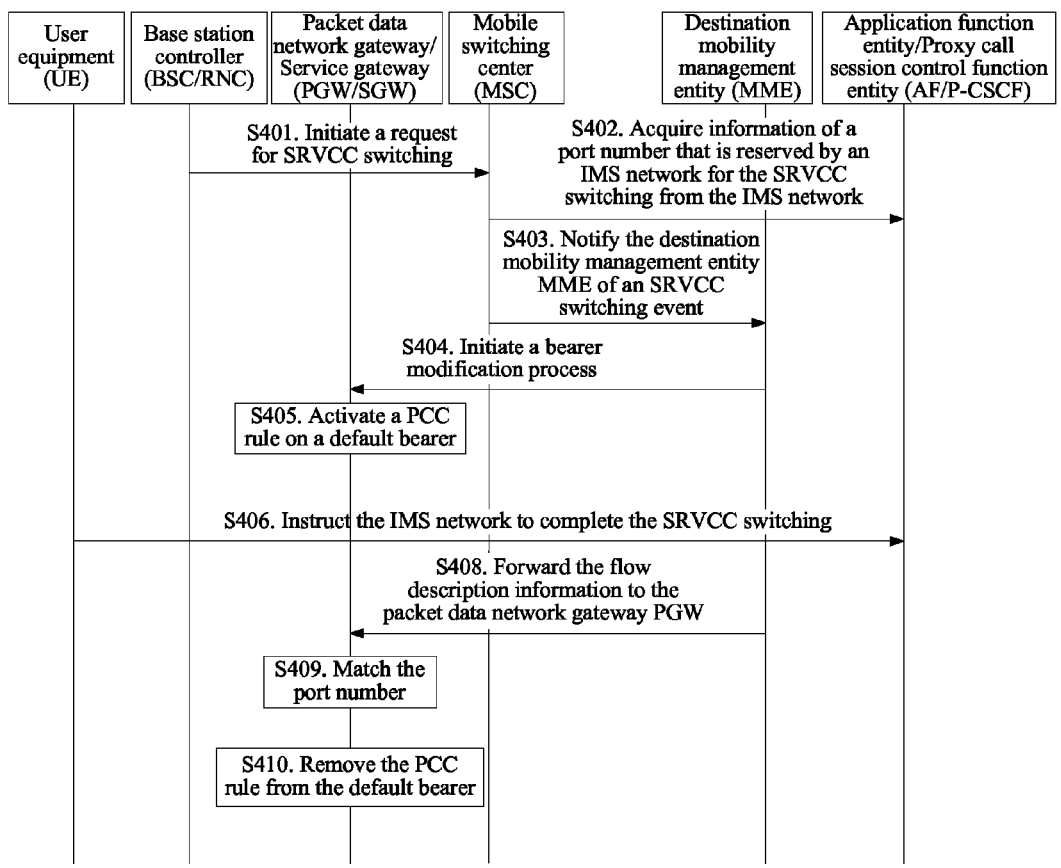
FIG. 4 is a schematic flowchart of interaction between various functional modules in a method for removing a policy and charging control rule from a default bearer according to another embodiment of the present invention.

For a clearer description of the foregoing embodiment, referring to FIG. 4, a process of interaction between various functional modules in a method for removing a policy and charging control rule from a default bearer according to an embodiment of the present invention includes step S401 to step S410. A detailed description is as follows:

S401. A base station controller initiates a request for SRVCC switching.

In this embodiment, the base station controller may be a 2G base station controller (Base Station Controller, BSC) in a circuit switched domain, or a 3G radio network controller (Radio Network Controller, RNC).

S402. A mobile switching center MSC acquires information of a port number that is reserved by an IMS network for the SRVCC switching from the IMS network.

Specifically, the MSC interacts with an AF or a P-CSCF to acquire information of a port number that is reserved by the AF or the P-CSCF for the SRVCC switching from the AF or the P-CSCF. As described previously, the port number that is reserved by the AF or the P-CSCF for the SRVCC switching is also the source port number of the downlink packet of the IMS service flow and certainly also the destination port number of the uplink packet of the IMS service flow.

S403. The mobile switching center notifies a destination mobility management entity MME of an SRVCC switching event.

When sending the notification, the mobile switching center points out the port number that is reserved by the AF or the P-CSCF for the SRVCC switching to the destination mobility management entity MME.

S404. The destination mobility management entity MME initiates a bearer modification process.

Here, signaling carries information such as a "CS to PS SRVCC" indication and the port number that is reserved by the AF or the P-CSCF for the SRVCC switching. Such information is sent through a service gateway SGW to a packet data network gateway PGW.

S405. The packet data network gateway PGW activates a PCC rule on a default bearer.

After the PCC rule is activated on the default bearer, a data packet to or from the IMS network is allowed to be transmitted on the default bearer. A specific method for activating a PCC rule may be: directly activating a pre-configured PCC rule, or making a PCC rule according to the information of the port number that is reserved by the AF or the P-CSCF for the SRVCC switching and stored by the packet data network gateway PGW in step S404. A specific manner of activating the PCC rule on the default bearer may not be limited in the present invention.

S406. A user equipment instructs the IMS network to complete the SRVCC switching.

In the embodiment of the present invention, the Single Radio Voice Call Continuity (Single Radio Voice Call Continuity, SRVCC) switching refers to switching of an IMS service from the circuit switched domain to the packet switched domain.

S407. The user equipment initiates a bearer modification process.

When the user equipment initiates the bearer modification process, signaling sent to the destination mobility management entity MME includes flow description information of the IMS service, such as the destination port number, the source port number, the destination IP address, and the source IP address of the downlink packet of the IMS service flow.

S408. The destination mobility management entity MME forwards the flow description information to the packet data network gateway PGW.

The IMS flow description information may be forwarded through a bearer resource command (Bearer Resource Command) sent to the PGW. That is, the bearer resource command carries the flow description information, such as the destination port number, the source port number, the destination IP address, and the source IP address of the downlink packet of the service flow.

S409: The packet data network gateway PGW matches the port number.

In this embodiment, the matching may specifically be: matching, by the packet data network gateway PGW, the source port number of the downlink packet of the service flow included in the flow description information with the port number that is reserved by the AF or the P-CSCF for the SRVCC switching.

It should be noted that in step S409, the packet data network gateway PGW may further make, according to the flow description information sent by the destination mobility management entity MME, a PCC rule corresponding to a new bearer created by a system for the IMS service that has switched to the PS domain.

S410. The packet data network gateway PGW removes the PCC rule from the default bearer.

That is, the packet data network gateway PGW removes the PCC rule activated by the packet data network gateway PGW in step S405 from the default bearer.

It should be noted that in step S410, while removing the activated PCC rule from the default bearer, the packet data network gateway PGW may further activate the PCC rule that is made in step S409 and corresponds to the new bearer. Such new PCC rules are used for the new bearer to transmit the IMS service that has switched to the PS domain.

In the embodiment of the present invention, the determining whether a received service flow is a service flow of Single Radio Voice Call Continuity SRVCC switching may further be: if received signaling includes an indication pointing out that a service initiated by the application function entity AF or the proxy call session control function entity P-CSCF is the IMS service switching from the circuit switched domain to the packet switched domain, determining that the received service flow is the service flow of the Single Radio Voice Call Continuity SRVCC switching. For a clearer description of this embodiment, referring to FIG. 5, a process of interaction between various functional modules in a method for removing a policy and charging control rule from a default bearer according to an embodiment of the present invention includes step S501 to step S510. A detailed description is as follows:

S501. A user equipment provides an IMS network with a port number reserved for SRVCC switching.

The port number reserved for the SRVCC switching that is provided by the user equipment for the IMS network may be reserved when the user equipment registers to the IMS network during switching of an IMS service from a circuit switched domain to a packet switched domain, which is one of preparatory work for switching the IMS service from the circuit switched domain to the packet switched domain. The information of the port number that is reserved by the user equipment for the SRVCC switching may be sent through registration signaling to the IMS network. The IMS network may specifically refer to a device or an entity unit on an IMS network side, such as an application function entity (Application Function, AF) or a proxy call session control function (Proxy Call Session Control Function, P-CSCF).

S502. The AF or the P-CSCF interacts with a PCRF to establish an Rx session for registration signaling of the user equipment.

When establishing the Rx session for the registration signaling of the user equipment, the AF or the P-CSCF points out the port number that is reserved by the user equipment for the SRVCC switching to the PCRF. In this embodiment, the port number that is reserved by the user equipment for the SRVCC switching is also the destination port number of the downlink packet of an IMS service flow and certainly also the source port number of the uplink packet of the IMS service flow.

S503. The PCRF stores information of the port number that is reserved by the user equipment for the SRVCC switching.

S504. The PCRF receives a "CS to PS SRVCC" indication from a packet data network gateway PGW.

The "CS to PS SRVCC" indication points out that the IMS service will switch from the circuit switched domain to the packet switched domain.

S505. The PCRF makes a policy and charging control (Policy and Charging Control, PCC) rule for a default bearer.

After the PCC rule is made for the default bearer, a data packet to or from the IMS network is allowed to be transmitted on the default bearer. A specific method for making a PCC rule may be: directly activating a pre-configured PCC rule, or making a PCC rule according to the information of the port number that is reserved by the user equipment for the SRVCC switching and stored by the PCRF in step S503. A specific manner of making the PCC rule for the default bearer may not be limited in the present invention.

S506. The PCRF returns a response to the PGW.

The response is used for the PGW to install the made PCC rule on the default bearer.

S507. The user equipment instructs the IMS network to complete the SRVCC switching.

In the embodiment of the present invention, the Single Radio Voice Call Continuity (Single Radio Voice Call Continuity, SRVCC) switching refers to switching of an IMS service from the circuit switched domain to the packet switched domain.

S508. The application function entity (Application Function, AF) or the proxy call session control function entity (Proxy Call Session Control Function, P-CSCF) initiates a service establishment or modification process.

When the AF or the P-CSCF initiates the service establishment or modification process, signaling includes flow description information and may also include an indication pointing out that a service initiated by the application function entity AF or the proxy call session control function entity P-CSCF is the IMS service switching from the circuit switched domain to the packet switched domain. Same as the foregoing embodiment, the flow description information also includes the destination port number, the source port number, the destination IP address, and the source IP address of the downlink packet of the IMS service flow, and the like.

S509. The PCRF determines whether a received service flow is a service flow of the Single Radio Voice Call Continuity SRVCC switching.

As described previously, in step S508, when the AF or the P-CSCF initiates the service establishment or modification process, the signaling sent by the AF or the P-CSCF may include an indication pointing out that the service initiated by the application function entity AF or the proxy call session control function entity P-CSCF is the IMS service switching from the circuit switched domain to the packet switched domain; therefore, the PCRF may determine whether the received service flow is the service flow of the Single Radio Voice Call Continuity SRVCC switching according to whether the signaling includes the indication.

It should be noted that in step S509, the PCRF may further make, according to the flow description information sent by the AF or the P-CSCF, a PCC rule corresponding to a new bearer created by a system for the IMS voice service that has switched to the PS domain.

S510. The PCRF instructs the PGW to remove the PCC rule from the default bearer.

That is, if determining that the received service flow is the service flow of the Single Radio Voice Call Continuity SRVCC switching, the PCRF instructs the PGW to remove the PCC rule made by the PCRF for the default bearer in step S505.

It should be noted that in step S510, while instructing the PGW to remove the PCC rule from the default bearer, the PCRF may further issue the PCC rule made in step S509 that corresponds to the new bearer to the PGW, so that the PGW installs the new PCC rule. Such new PCC rules are used for the new bearer to transmit the IMS service that has switched to the PS domain.

In another embodiment of the present invention, the determining whether a received service flow is a service flow of Single Radio Voice Call Continuity SRVCC switching may further be: if received signaling includes an indication pointing out that a resource applied for by the user equipment is used for the IMS service switching from the circuit switched domain to the packet switched domain, determining that the received service flow is the service flow of the Single Radio Voice Call Continuity SRVCC switching. For a clearer description of this embodiment, referring to FIG. 6, a process of interaction between various functional modules in a method for removing a policy and charging control rule from a default bearer according to an embodiment of the present invention includes step S601 to step S610. A detailed description is as follows:

S601. A base station controller initiates a request for SRVCC switching.

In this embodiment, the base station controller may be a 2G base station controller (Base Station Controller, BSC) in a circuit switched domain, or a 3G radio network controller (Radio Network Controller, RNC).

S602. A mobile switching center MSC acquires information of a port number that is reserved by an IMS network for the SRVCC switching from the IMS network.

Specifically, the MSC interacts with an AF or a P-CSCF to acquire information of a port number that is reserved by the AF or the P-CSCF for the SRVCC switching from the AF or the P-CSCF. In this embodiment, the port number that is reserved by the AF or the P-CSCF for the SRVCC switching is also the source port number of the downlink packet of the IMS service flow and certainly also the destination port number of the uplink packet of the IMS service flow.

S603. The mobile switching center notifies a destination mobility management entity MME of an SRVCC switching event.

When sending the notification, the mobile switching center points out the port number that is reserved by the AF or the P-CSCF for the SRVCC switching to the destination mobility management entity MME.

S604. The destination mobility management entity MME initiates a bearer modification process.

Here, signaling carries information such as a "CS to PS SRVCC" indication and the IMS port number that is reserved by the AF or the P-CSCF for the SRVCC switching. Such information is sent through a service gateway SGW to a packet data network gateway PGW.

S605. The packet data network gateway PGW activates a PCC rule on a default bearer.

After the PCC rule is activated on the default bearer, a data packet to or from the IMS network is allowed to be transmitted on the default bearer. A specific method for activating a PCC rule may be: directly activating a pre-configured PCC rule, or making a PCC rule according to the information of the port number that is reserved by the AF or the P-CSCF for the SRVCC switching and stored by the packet data network gateway PGW in step S604. A specific manner of activating the PCC rule on the default bearer may not be limited in the present invention.

S606. A user equipment instructs the IMS network to complete the SRVCC switching.

In the embodiment of the present invention, the Single Radio Voice Call Continuity (Single Radio Voice Call Continuity, SRVCC) switching refers to switching of an IMS service from the circuit switched domain to the packet switched domain.

S607. The user equipment initiates a bearer modification process.

When the user equipment initiates the bearer modification process, bearer resource modification signaling sent to the destination mobility management entity MME includes flow description information of the IMS service, such as the destination port number, the source port number, the destination IP address, and the source IP address of the downlink packet of the IMS service flow; and the bearer resource modification signaling may further include an indication pointing out that a resource applied for by the user equipment is used for the IMS service switching from the circuit switched domain to the packet switched domain.

S608. The destination mobility management entity MME forwards the flow description information to the packet data network gateway PGW.

The flow description information may be forwarded through a bearer resource command (Bearer Resource Command) sent to the PGW. That is, the bearer resource command carries the flow description information, such as the destination port number, the source port number, the destination IP address, and the source IP address of the downlink packet of the service flow. In this embodiment, the bearer resource command may further include an indication pointing out that the resource applied for by the user equipment is used for the IMS service switching from the circuit switched domain to the packet switched domain, where the indication is sent by the user equipment to the destination mobility management entity MME through the bearer resource command.

S609. The packet data network gateway PGW determines whether a received service flow is a service flow of the Single Radio Voice Call Continuity SRVCC switching.

As described previously, in step S608, the bearer resource command may further include an indication pointing out that the resource applied for by the user equipment is used for the IMS service switching from the circuit switched domain to the packet switched domain; therefore, the packet data network gateway PGW may determine whether the received service flow is the service flow of the Single Radio Voice Call Continuity SRVCC switching according to whether the bearer resource command includes the indication.

S610. The packet data network gateway PGW removes the PCC rule from the default bearer.

That is, if determining that the received service flow is the service flow of the Single Radio Voice Call Continuity SRVCC switching, the packet data network gateway PGW removes the PCC rule activated by the packet data network gateway PGW in step S605 from the default bearer.

Figure 7:
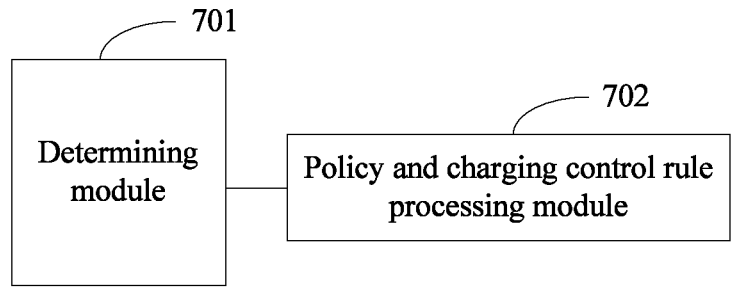
FIG. 7 is a schematic structural diagram of an apparatus for removing a policy and charging control rule from a default bearer according to an embodiment of the present invention.

It should be noted that in step S610, while removing the activated PCC rule from the default bearer, the packet data network gateway PGW may further activate the corresponding PCC rule made for the new bearer in step S609. Such new PCC rules are used for the new bearer to transmit the IMS service that has switched to the PS domain. Refer to FIG. 7, which is a schematic structural diagram of an apparatus for removing a policy and charging control rule from a default bearer according to an embodiment of the present invention. For ease of description, only parts related to the embodiment of the present invention are shown. The apparatus for removing a policy and charging control rule from a default bearer shown in FIG. 7 includes a determining module 701 and a policy and charging control rule processing module 702.

The determining module 701 is configured to determine whether a received service flow is a service flow of Single Radio Voice Call Continuity SRVCC switching upon receipt of flow description information of the service flow. The policy and charging control rule processing module 702 is configured to: if the determining module 701 determines that the received service flow is the service flow of the Single Radio Voice Call Continuity SRVCC switching, remove a policy and charging control rule that has been activated on a default bearer for the SRVCC switching, and at the same time issue a policy and charging control rule made for a newly created bearer.

It should be noted that in the implementation manner of the apparatus for removing a policy and charging control rule from a default bearer, division of various functional modules is only an exemplary description, and the foregoing functions may be allocated to be performed by different functional modules according to a requirement in a practical application, for example, when a configuration requirement of corresponding hardware or facilitating software implementation is considered. That is, internal structure of the apparatus for removing a policy and charging control rule from a default bearer is divided into different functional modules so as to perform all or a part of the functions described above.

In addition, in a practical application, a corresponding functional module in the embodiment may be implemented by corresponding hardware, or may also be performed by executing, by corresponding hardware, corresponding software. For example, the determining module may be hardware capable of determining whether a received service flow is a service flow of Single Radio Voice Call Continuity SRVCC switching upon receipt of flow description information of the service flow, such as a determining device; or may also be a general processor or another hardware device that is capable of executing a corresponding computer program so as to perform the foregoing functions.

For another example, the policy and charging control rule processing module may be hardware capable of executing a function of removing, if the determining module (or the determining device) determines that the received service flow is the service flow of the Single Radio Voice Call Continuity SRVCC switching, a policy and charging control rule that has been activated on a default bearer for the SRVCC switching, and at the same time issuing a policy and charging control rule made for a newly created bearer; and for another example again, the policy and charging control rule processing module may also be a general processor or another hardware device that is capable of executing a corresponding computer program so as to perform the foregoing functions (and the principle described above may apply to all embodiments provided in this Specification).

Figure 8:
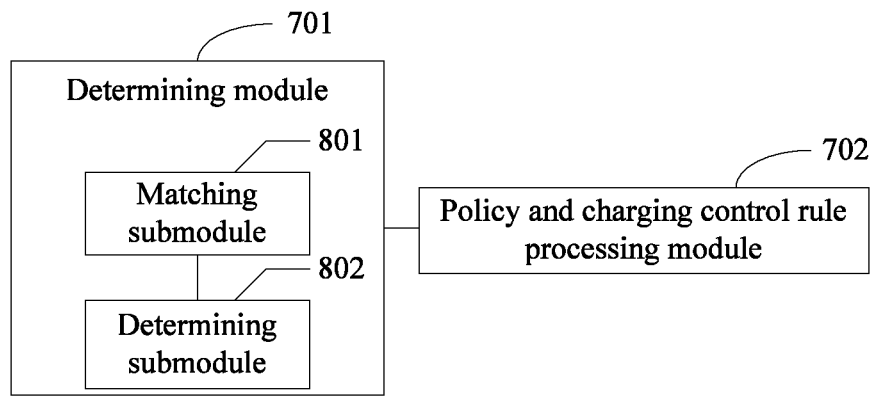
FIG. 8 is a schematic structural diagram of an apparatus for removing a policy and charging control rule from a default bearer according to another embodiment of the present invention.

In the apparatus for removing a policy and charging control rule from a default bearer shown in FIG. 7, the flow description information includes a port number of a service flow packet, and the determining module 701 may include a matching submodule 801 and a determining submodule 802, as shown in FIG. 8, which shows an apparatus for removing a policy and charging control rule from a default bearer according to another embodiment of the present invention.

The matching submodule 801 is configured to match a port number reserved for the SRVCC switching with the port number of the service flow packet included in the flow description information. The determining submodule 802 is configured to determine that the received service flow is the service flow of the Single Radio Voice Call Continuity SRVCC switching if the port number reserved for the SRVCC switching is consistent with the port number of the packet included in the flow description information.

Figure 9A:
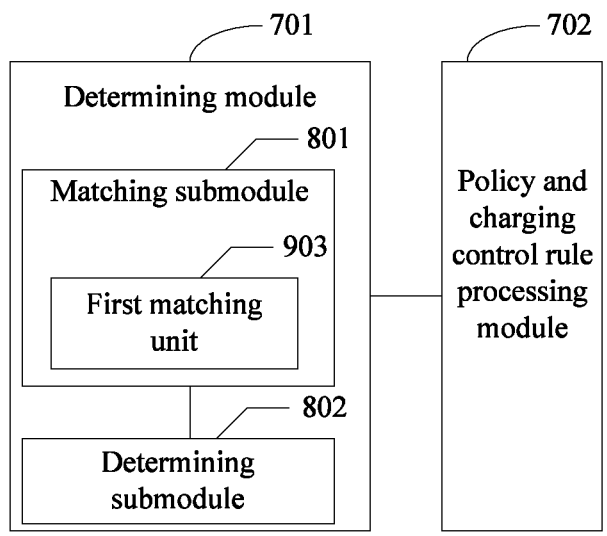
FIG. 9a is a schematic structural diagram of an apparatus for removing a policy and charging control rule from a default bearer according to another embodiment of the present invention.

In the apparatus for removing a policy and charging control rule from a default bearer shown in FIG. 8, the port number of the service flow packet may include a destination port number of a downlink packet of the service flow. The matching submodule 801 shown in FIG. 8 may include a first matching unit 903, as shown in FIG. 9a, which shows an apparatus for removing a policy and charging control rule from a default bearer according to another embodiment of the present invention. The apparatus for removing a policy and charging control rule from a default bearer may be a policy control and charging rules function entity PCRF in the method for removing a policy and charging control rule from a default bearer shown in FIG. 2. The first matching unit 903 is configured to match the destination port number of the downlink packet of the service flow included in the flow description information with a port number that is reserved by a user equipment for the SRVCC switching during registration to an IMS network.

Figure 9B:
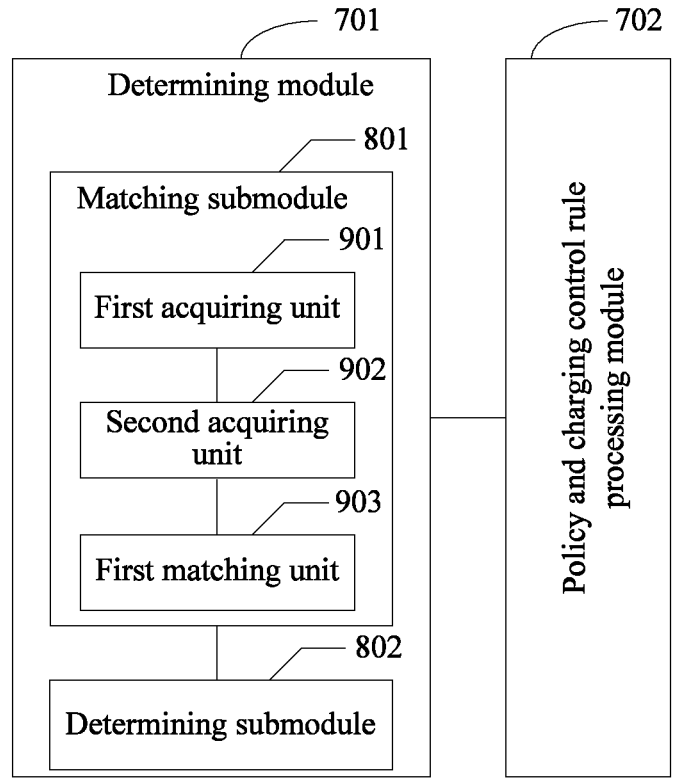
FIG. 9b is a schematic structural diagram of an apparatus for removing a policy and charging control rule from a default bearer according to another embodiment of the present invention.

The matching submodule 801 shown in FIG. 9a may further include a first acquiring unit 901 and a second acquiring unit 902, as shown in FIG. 9b, which shows an apparatus for removing a policy and charging control rule from a default bearer according to another embodiment of the present invention. The first acquiring unit 901 is configured to interact with an application function entity AF or a proxy call session control function entity P-CSCF, and acquire the port number that is reserved by the user equipment for the SRVCC switching during the registration to the IMS network. The second acquiring unit 902 is configured to acquire the flow description information by interacting with the AF or the P-CSCF after a switching process of switching an IMS service from a circuit switched domain to a packet switched domain is completed.

Figure 10A:
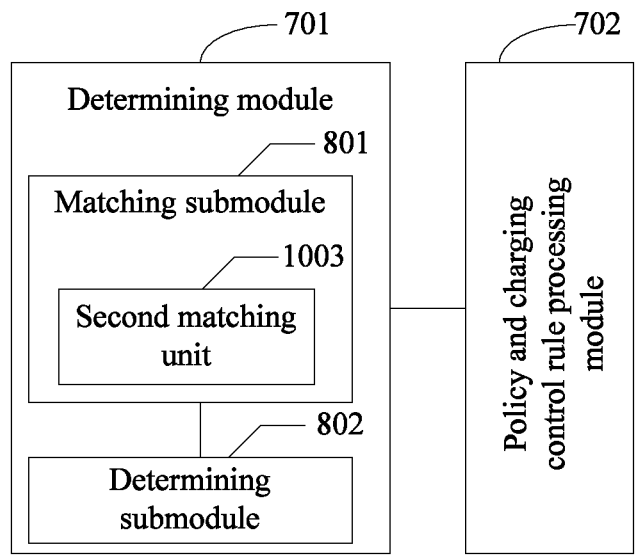
FIG. 10*a* is a schematic structural diagram of an apparatus for removing a policy and charging control rule from a default bearer according to another embodiment of the present invention.

In the apparatus for removing a policy and charging control rule from a default bearer shown in FIG. 8, the port number of the service flow packet may include a source port number of a downlink packet of a voice service flow. The matching submodule 801 shown in FIG. 8 may include a second matching unit 1003, as shown in FIG. 10a, which shows an apparatus for removing a policy and charging control rule from a default bearer according to another embodiment of the present invention. The apparatus for removing a policy and charging control rule from a default bearer may be a policy control and charging rules function entity PCRF in the method for removing a policy and charging control rule from a default bearer shown in FIG. 3. The second matching unit 1003 is configured to match the source port number of the downlink packet of the service flow included in the flow description information with a port number that is reserved by an IMS network for the SRVCC switching.

Figure 10B:
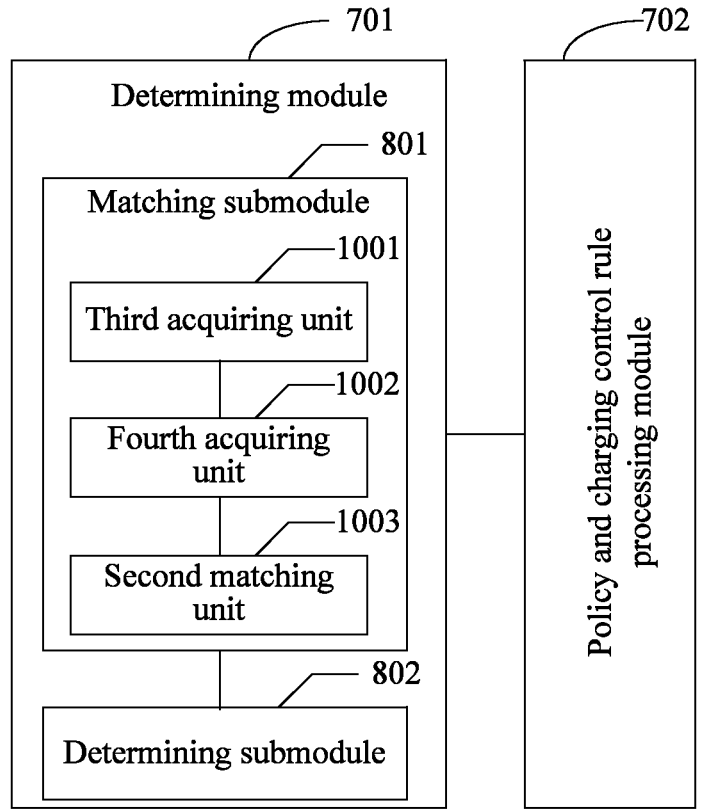
FIG. 10*b* is a schematic structural diagram of an apparatus for removing a policy and charging control rule from a default bearer according to another embodiment of the present invention.

The matching submodule 801 shown in FIG. 10a may further include a third acquiring unit 1001 and a fourth acquiring unit 1002, as shown in FIG. 10b, which shows an apparatus for removing a policy and charging control rule from a default bearer according to another embodiment of the present invention.

The third acquiring unit 1001 is configured to interact with a packet data network gateway PGW and acquire the port number that is reserved by the IMS network for the SRVCC switching. The fourth acquiring unit 1002 is configured to acquire the flow description information by interacting with an application function entity AF or a proxy call session control function entity P-CSCF after a switching process of switching an IMS service from a circuit switched domain to a packet switched domain is completed.

Figure 11A:
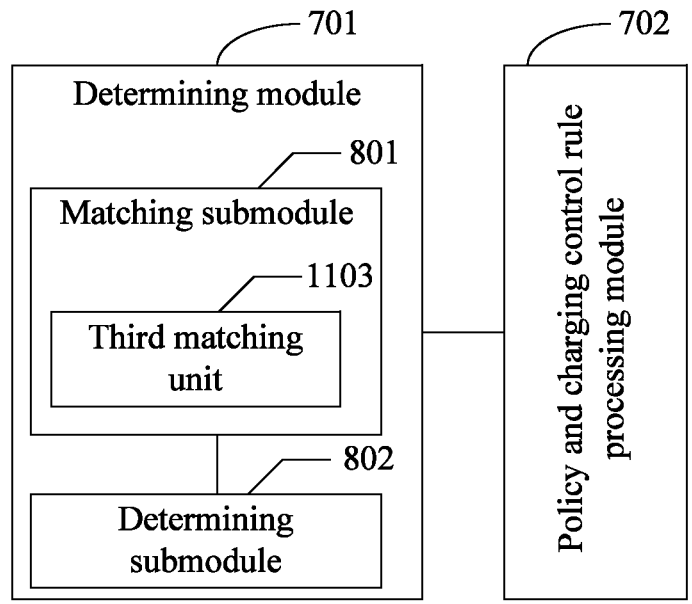
FIG. 11*a* is a schematic structural diagram of an apparatus for removing a policy and charging control rule from a default bearer according to another embodiment of the present invention.

In the apparatus for removing a policy and charging control rule from a default bearer shown in FIG. 8, the port number of the service flow packet may include a source port number of a downlink packet of the service flow. The matching submodule 801 shown in FIG. 8 may include a third matching unit 1103, as shown in FIG. 11a, which shows an apparatus for removing a policy and charging control rule from a default bearer according to another embodiment of the present invention. The apparatus for removing a policy and charging control rule from a default bearer may be a packet data network gateway PGW in the method for removing a policy and charging control rule from a default bearer shown in FIG. 4. The third matching unit 1103 is configured to match the source port number of the downlink packet of the service flow included in the flow description information with a port number that is reserved by an IMS network for the SRVCC switching.

Figure 11B:
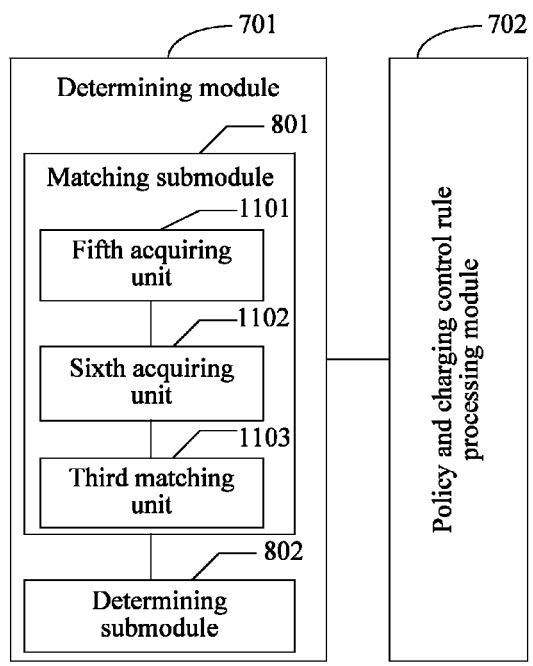
FIG. 11*b* is a schematic structural diagram of an apparatus for removing a policy and charging control rule from a default bearer according to another embodiment of the present invention.
Figure 12:
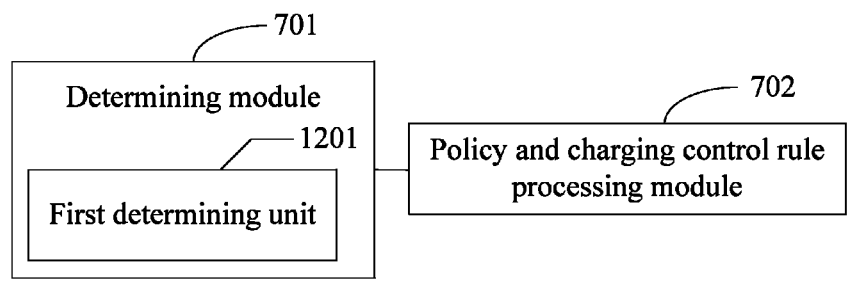
FIG. 12 is a schematic structural diagram of an apparatus for removing a policy and charging control rule from a default bearer according to another embodiment of the present invention.
Figure 13:
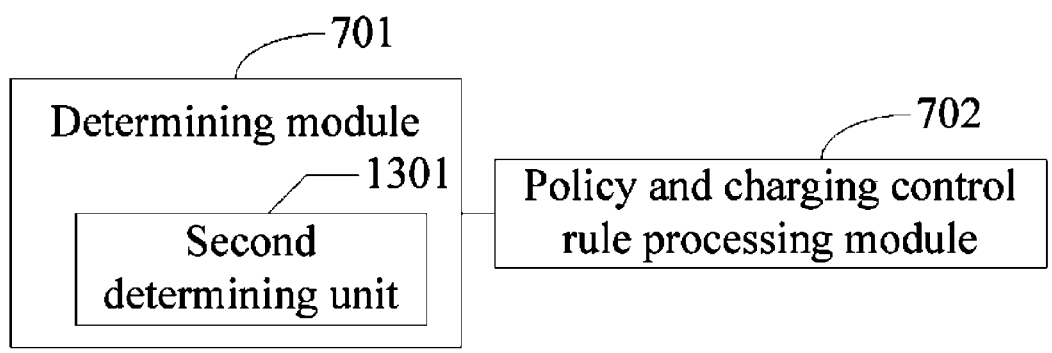
FIG. 13 is a schematic structural diagram of an apparatus for removing a policy and charging control rule from a default bearer according to another embodiment of the present invention.

The matching submodule 801 shown in FIG. 11*a* may further include a fifth acquiring unit 1101 and a sixth acquiring unit 1102, as shown in FIG. 11*b*, which shows an apparatus for removing a policy and charging control rule from a default bearer according to another embodiment of the present invention. The fifth acquiring unit 1101 is configured to interact with a destination mobility management entity MME, and acquire a port number that is reserved by the IMS network for the SRVCC switching during switching of an IMS voice service from a circuit switched domain to a packet switched domain. The sixth acquiring unit 1102 is configured to acquire the flow description information by interacting with the destination MME after a switching process of switching the IMS service from the circuit switched domain to the packet switched domain is completed.

Figure 5:
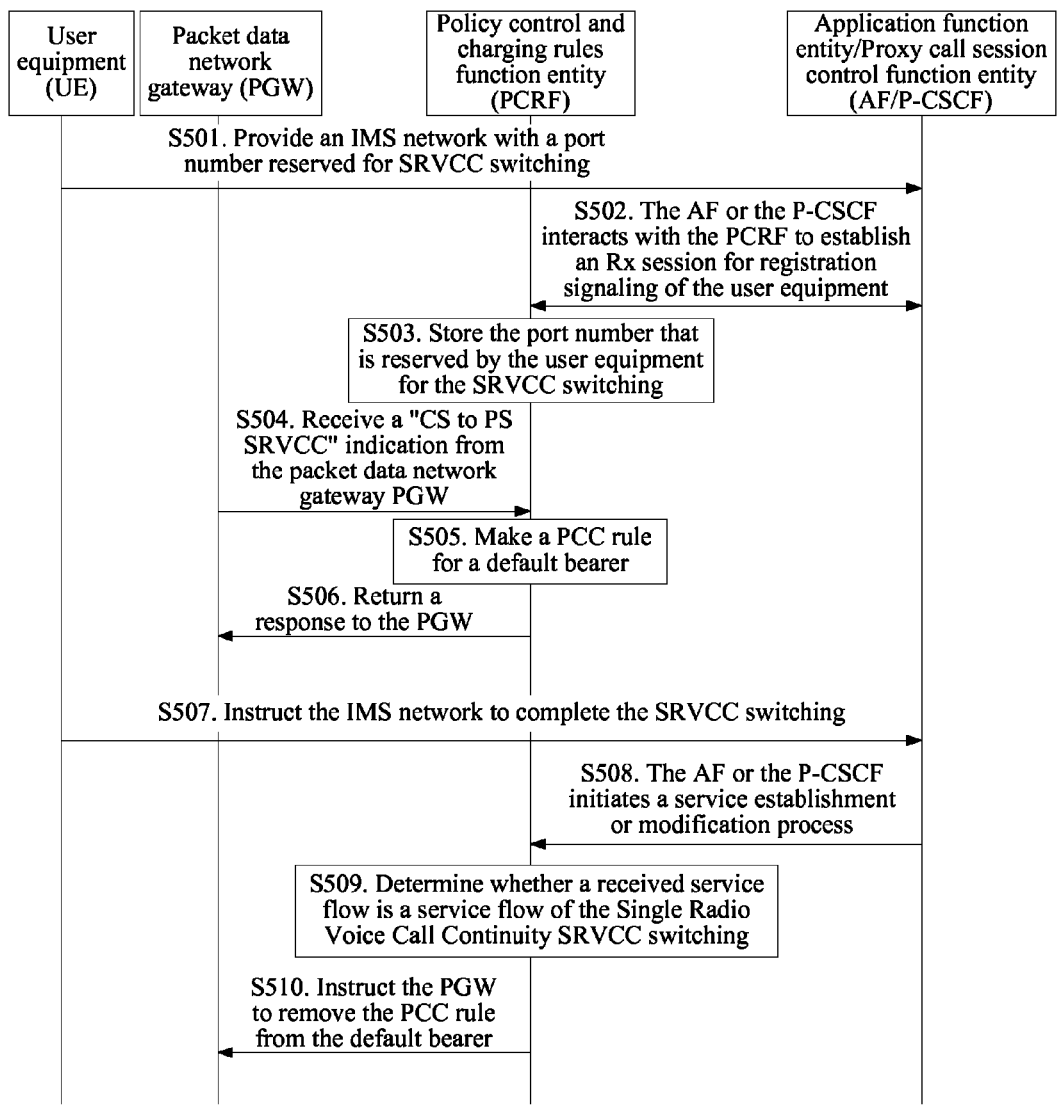
FIG. 5 is a schematic flowchart of interaction between various functional modules in a method for removing a policy and charging control rule from a default bearer according to another embodiment of the present invention.

The apparatus for removing a policy and charging control rule from a default bearer shown in FIG. 7 may be a policy control and charging rules function entity PCRF in the method for removing a policy and charging control rule from a default bearer shown in FIG. 5, and the determining module 701 may include a first determining unit 1201. The first determining unit 1201 is configured to: if received signaling includes an indication pointing out that a service initiated by an application function entity AF or a proxy call session control function entity P-CSCF is an IMS service switching from a circuit switched domain to a packet switched domain, determine that the received service flow is the service flow of the Single Radio Voice Call Continuity SRVCC switching.

Figure 6:
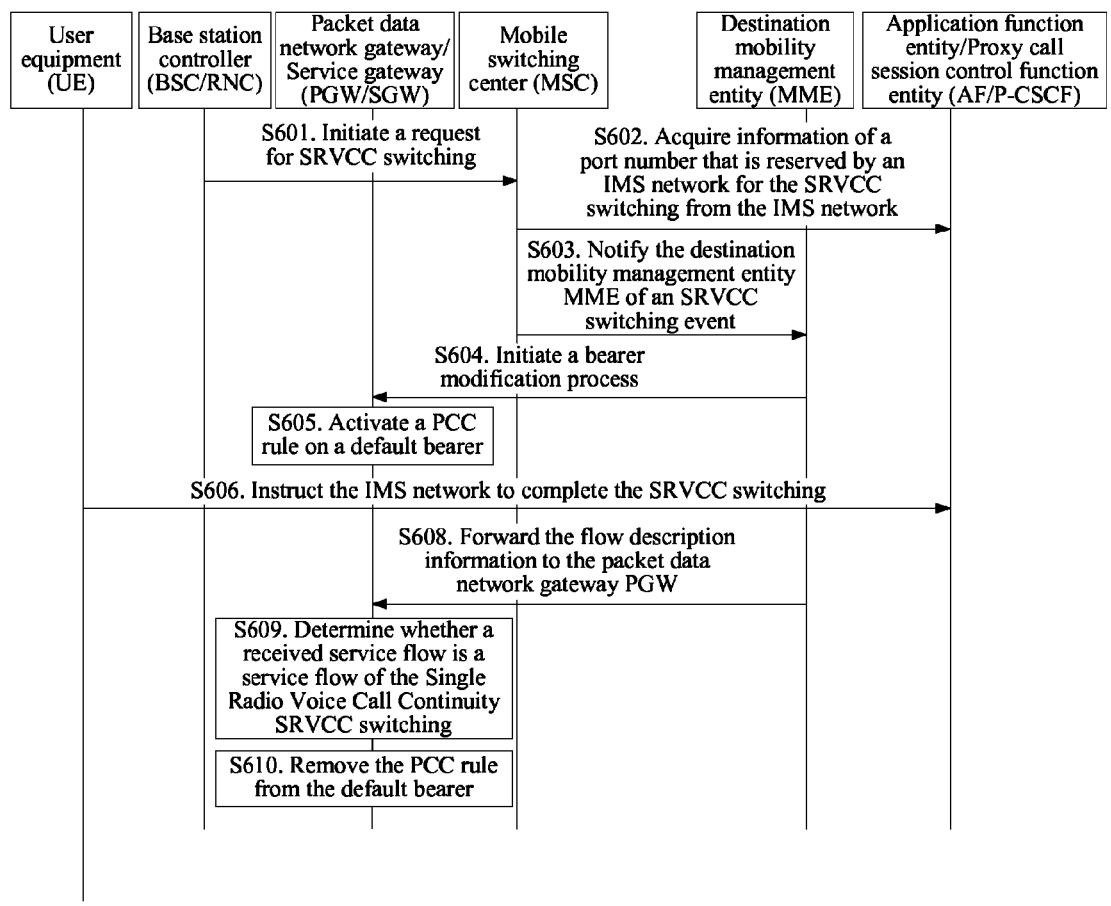
FIG. 6 is a schematic flowchart of interaction between various functional modules in a method for removing a policy and charging control rule from a default bearer according to another embodiment of the present invention.

The apparatus for removing a policy and charging control rule from a default bearer shown in FIG. 7 may be a packet data network gateway PGW in the method for removing a policy and charging control rule from a default bearer shown in FIG. 6, and the determining module 701 may include a second determining unit 1301. The second determining unit 1301 is configured to: if received signaling includes an indication pointing out that a resource applied for by a user equipment is used for an IMS service switching from a circuit switched domain to a packet switched domain, determine that the received service flow is the service flow of the Single Radio Voice Call Continuity SRVCC switching.

It should be noted that the content about processes of information exchange, execution, and the like between various modules or units of the foregoing apparatus is based on same thoughts as the method embodiments of the present invention and a technical effect brought by the apparatus is the same as that of the method embodiments of the present invention; for specific content, reference may be made to descriptions of the method embodiments of the present invention, and details are not repeated herein.

A person of ordinary skill in the art may understand that all or a part of the steps of the methods in the foregoing embodiments may be implemented by a program instructing relevant hardware, for example, by one or more or all of the following methods steps: determining whether a received service flow is a service flow of Single Radio Voice Call Continuity SRVCC switching upon receipt of flow description information of the service flow; and if the received service flow is the service flow of the Single Radio Voice Call Continuity SRVCC switching, removing a policy and charging control rule that has been activated on a default bearer for the SRVCC switching, and at the same time issuing a policy and charging control rule made for a newly created bearer.

A person of ordinary skill in the art may understand that all or a part of the steps of the methods in the foregoing embodiments may be implemented by a program instructing relevant hardware. The program may be stored in a computer readable storage medium, and the storage medium may be a read-only memory (ROM), a random access memory (RAM), a magnetic disk, or an optical disc.

The foregoing detailed descriptions are about a method and an apparatus for removing a policy and charging control rule from a default bearer provided in the embodiments of the present invention. Specific examples are used herein for illustrating principles and implementation manners of the present invention. The foregoing description about the embodiments is merely for helping to understand the methods and core ideas of the present invention. Meanwhile, a person of ordinary skill in the art may make modifications to the specific implementation manners and application scopes according to the ideas of the present invention. In conclusion, the content of this Specification should not be construed as a limitation to the present invention.

What is claimed is:

1. A method for removing a policy and charging control rule from a default bearer, the method comprising:
   determining that a received service flow is a service flow of Single Radio Voice Call Continuity (SRVCC) switching upon receipt of flow description information of the service flow; and
   in response to determining that a received service flow is a service flow of SRVCC switching upon receipt of the flow description information, and after a new bearer is created for the received service flow of SRVCC switching, removing a policy and charging control rule that has been activated on a default bearer for the SRVCC switching and, at the same time, issuing a policy and charging control rule made for the newly created bearer.

2. The method according to claim 1, wherein the flow description information comprises a port number of a service flow packet and wherein determining that the received service flow is a service flow of SRVCC switching comprises:
   matching a port number reserved for the SRVCC switching with the port number of the service flow packet comprised in the flow description information; and
   determining that the received service flow is the service flow of the SRVCC switching because the port number reserved for the SRVCC switching is consistent with the port number of the packet comprised in the flow description information.

3. The method according to claim 2, wherein the port number of the service flow packet comprises a destination port number of a downlink packet of the service flow wherein matching the port number reserved for the SRVCC switching with the port number of the service flow packet comprised in the flow description information comprises matching, by a policy control and charging rules function entity (PCRF), the destination port number of the downlink packet of the service flow comprised in the flow description information with a port number that is reserved by a user equipment for the SRVCC switching during registration to an IMS network.

4. The method according to claim 3, wherein, before matching the destination port number of the downlink packet of the service flow comprised in the flow description information with a port number that is reserved by a user equipment for the SRVCC switching during registration to an IMS network, the method further comprises:
   interacting, by the PCRF, with an application function entity (AF) or a proxy call session control function entity (P-CSCF), and acquiring the port number that is reserved by the user equipment for the SRVCC switching during the registration to the IMS network; and
   acquiring, by the PCRF, the flow description information by interacting with the AF or the P-CSCF after a switching process of switching an IMS service from a circuit switched domain to a packet switched domain is completed.

5. The method according to claim 2, wherein the port number of the service flow packet comprises a source port number of a downlink packet of the service flow and wherein matching the port number reserved for the SRVCC switching with the port number of the service flow packet comprised in the flow description information comprises matching, by a policy control and charging rules function entity (PCRF), the source port number of the downlink packet of the service flow comprised in the flow description information with a port number that is reserved by an IMS network for the SRVCC switching.

6. The method according to claim 5, wherein before matching the source port number of the downlink packet of the service flow comprised in the flow description information with the port number that is reserved by an IMS network for the SRVCC switching, the method further comprises:
   interacting, by the PCRF, with a packet data network gateway (PGW) to acquire the port number that is reserved by the IMS network for the SRVCC switching; and
   acquiring, by the PCRF, the flow description information by interacting with an application function entity (AF) or a proxy call session control function entity (P-CSCF) after a switching process of switching an IMS service from a circuit switched domain to a packet switched domain is completed.

7. The method according to claim 2, wherein the port number of the service flow packet comprises a source port number of a downlink packet of the service flow and wherein matching the port number reserved for the SRVCC switching with the port number of the service flow packet comprised in the flow description information comprises matching, by a packet data network gateway (PGW), the source port number of the downlink packet of the service flow comprised in the flow description information with a port number that is reserved by an IMS network for the SRVCC switching.

8. The method according to claim 7, wherein, before matching a source port number of a downlink packet of the service flow comprised in the flow description information with the port number that is reserved by an IMS network for the SRVCC switching, the method further comprises:
   interacting, by the PGW, with a destination mobility management entity (MME) and acquiring the port number that is reserved by the IMS network for the SRVCC switching; and
   acquiring, by the PGW, the flow description information by interacting with the destination MME after a switching process of switching an IMS service from a circuit switched domain to a packet switched domain is completed.

9. The method according to claim 1, wherein determining that the received service flow is a service flow of SRVCC switching comprises determining that the received service flow is the service flow of the SRVCC switching when received signaling comprises an indication pointing out that a service initiated by an application function entity (AF) or a proxy call session control function entity (P-CSCF) is an IMS service switching from a circuit switched domain to a packet switched domain.

10. The method according to claim 1, wherein determining that a received service flow is a service flow of SRVCC switching comprises determining that the received service flow is the service flow of SRVCC switching when received signaling comprises an indication pointing out that a resource applied for by a user equipment is used for an IMS service switching from a circuit switched domain to a packet switched domain.

11. An apparatus for removing a policy and charging control rule from a default bearer, the apparatus comprising:
   a processor; and
   a non-transitory computer-readable storage medium storing a program to be executed by the processor, the program including instructions for:
     determining whether a received service flow is a service flow of Single Radio Voice Call Continuity (SRVCC) switching upon receipt of flow description information of the service flow; and
     in response to determining that the received service flow is the service flow of the SRVCC switching, and after a new bearer is created for the received service flow of SRVCC switching, removing a policy and charging control rule that has been activated on a default bearer for the SRVCC switching and, at the same time, issuing a policy and charging control rule made for the newly created bearer.

12. An apparatus for removing a policy and charging control rule from a default bearer, the apparatus comprising:
   a processor; and
   a non-transitory computer-readable storage medium storing a program to be executed by the processor, the program including instructions for:
     determining whether a received service flow is a service flow of Single Radio Voice Call Continuity (SRVCC) switching upon receipt of flow description information of the service flow; and
     when it is determined that the received service flow is the service flow of the SRVCC switching, removing a policy and charging control rule that has been activated on a default bearer for the SRVCC switching and, at the same time, issuing a policy and charging control rule made for a newly created bearer;
   wherein the flow description information comprises a port number of a service flow packet and wherein the program further includes instructions for:
     matching a port number reserved for the SRVCC switching with the port number of the service flow packet comprised in the flow description information; and
     determining that the received service flow is the service flow of the SRVCC switching when the port number reserved for the SRVCC switching is consistent with the port number of the packet comprised in the flow description information.

13. The apparatus according to claim 12, wherein the apparatus is a policy control and charging rules function entity (PCRF) and the port number of the service flow packet comprises a destination port number of a downlink packet of the service flow; and
    wherein the program further includes instructions for matching the destination port number of the downlink packet of the service flow comprised in the flow description information with a port number that is reserved by a user equipment for the SRVCC during registration to an IMS network.

14. The apparatus according to claim 13, wherein the program further includes instructions for:
    interacting with an application function entity AF or a proxy call session control function entity (P-CSCF) and acquiring the port number that is reserved by the user equipment for the SRVCC switching during the registration to the IMS network; and
    acquiring the flow description information by interacting with the AF or the P-CSCF after a switching process of switching an IMS service from a circuit switched domain to a packet switched domain is completed.

15. The apparatus according to claim 12, wherein the apparatus is a policy control and charging rules function entity (PCRF) and the port number of the service flow packet comprises a source port number of a downlink packet of the service flow; and
    wherein the program further includes instructions for matching the source port number of the downlink packet of the service flow comprised in the flow description information with a port number that is reserved by an IMS network for the SRVCC switching.

16. The apparatus according to claim 15, wherein the program further includes instructions for:
    interacting with a packet data network gateway (PGW) and acquiring the port number that is reserved by the IMS network for the SRVCC switching; and
    acquiring the flow description information by interacting with an application function entity (AF) or a proxy call session control function entity (P-CSCF) after a switching process of switching an IMS service from a circuit switched domain to a packet switched domain is completed.

17. The apparatus according to claim 12, wherein the apparatus is a packet data network gateway (PGW) and the port number of the service flow packet comprises a source port number of a downlink packet of the service flow; and
    wherein the program further includes instructions for matching the source port number of the downlink packet of the service flow comprised in the flow description information with a port number that is reserved by an IMS network for the SRVCC switching.

18. The apparatus according to claim 17, wherein the program further includes instructions for:
    interacting with a destination mobility management entity (MME) and acquiring the port number that is reserved by the IMS network for the SRVCC switching; and
    acquiring the flow description information by interacting with the destination MME after a switching process of switching an IMS service from a circuit switched domain to a packet switched domain is completed.

19. The apparatus according to claim 11, wherein the apparatus is a policy charging and control rules function entity (PCRF) and wherein the program further includes instructions for determining that the received service flow is the service flow of the SRVCC switching when received signaling comprises an indication pointing out that a service initiated by an application function entity AF or a proxy call session control function entity P-CSCF is an IMS service switching from a circuit switched domain to a packet switched domain.

20. The apparatus according to claim 11, wherein the apparatus is a packet data network gateway (PGW) and wherein the program further includes instructions for determining that the received service flow is the service flow of the SRVCC switching when received signaling comprises an indication pointing out that a resource applied for by a user equipment is used for an IMS service switching from a circuit switched domain to a packet switched domain.

\* \* \* \* \*